Figure 1:
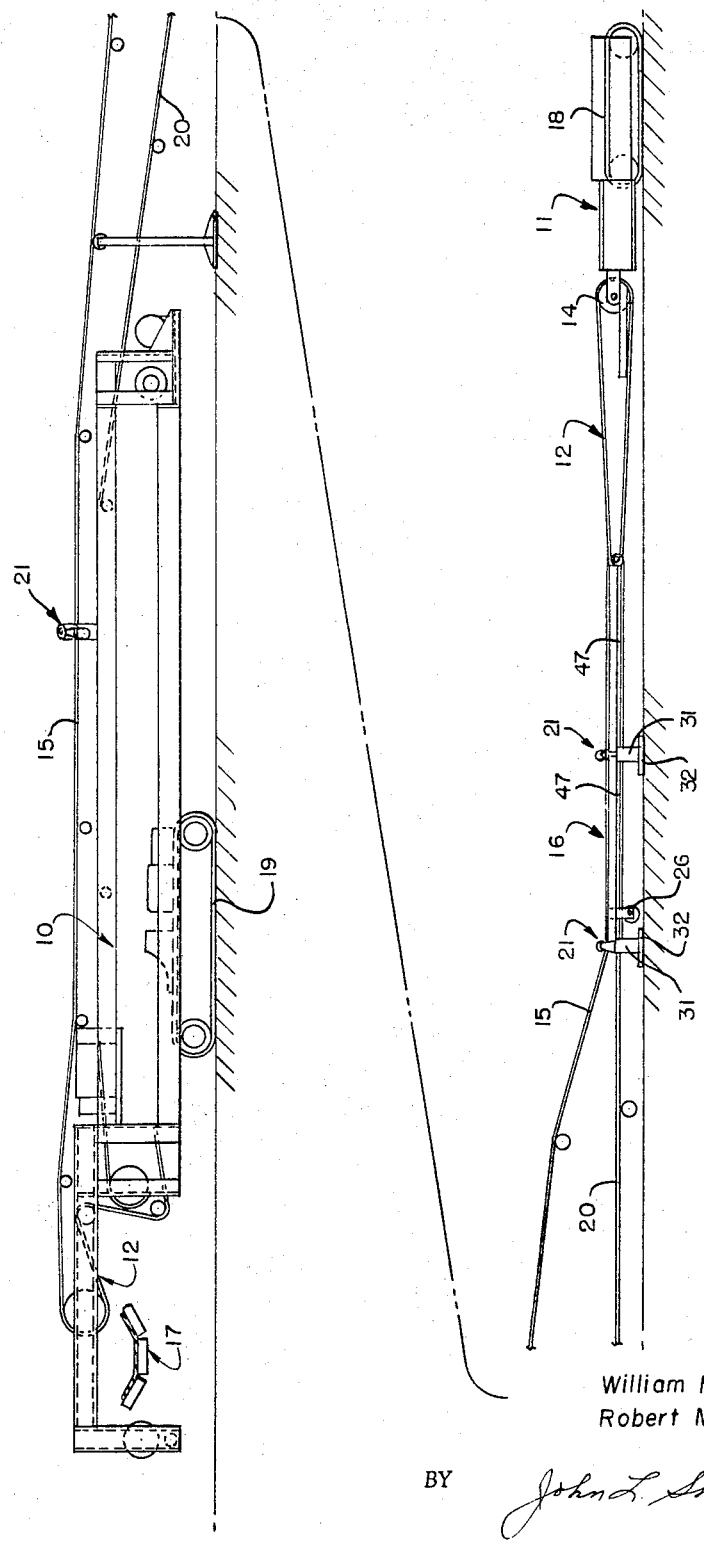

Sept. 13, 1966    R. M. PROMIN ET AL    3,272,315
EXTENSIBLE BELT CONVEYOR
Filed Dec. 20, 1963    3 Sheets-Sheet 1

INVENTORS
William F. Bankauf
Robert M. Promin

BY John L. Shortley
ATTORNEY

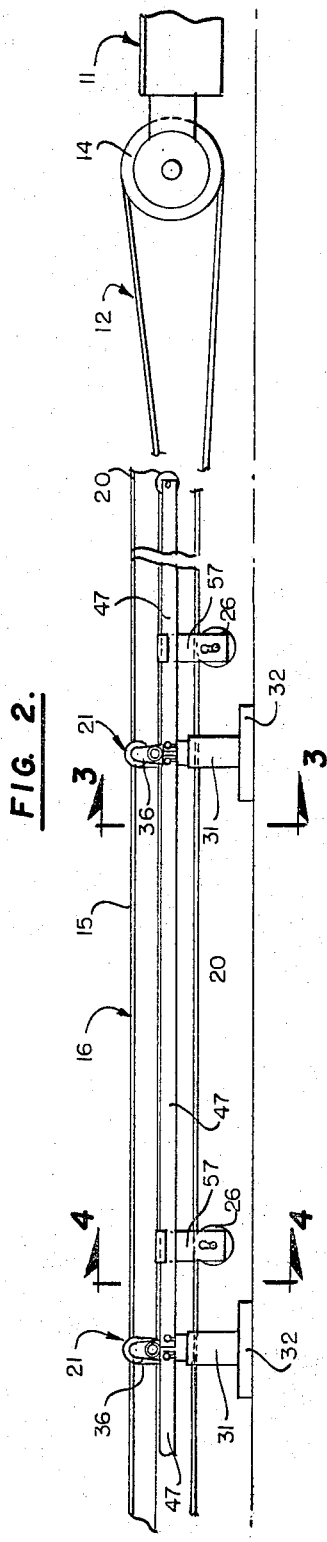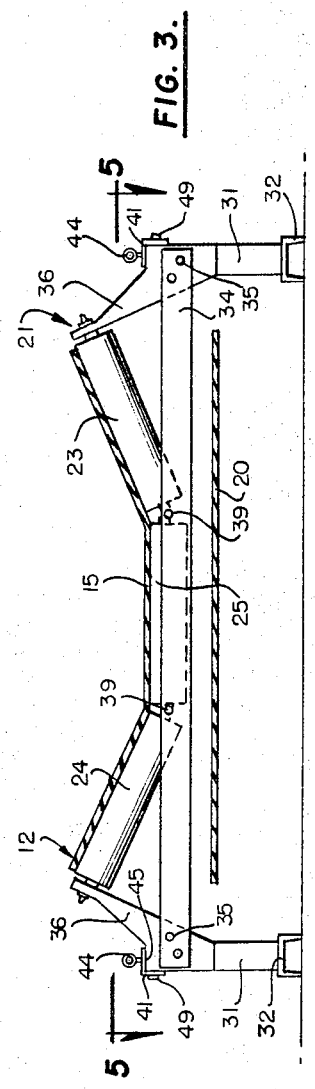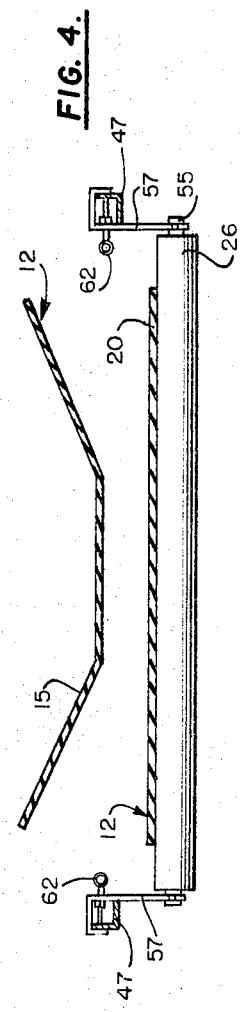

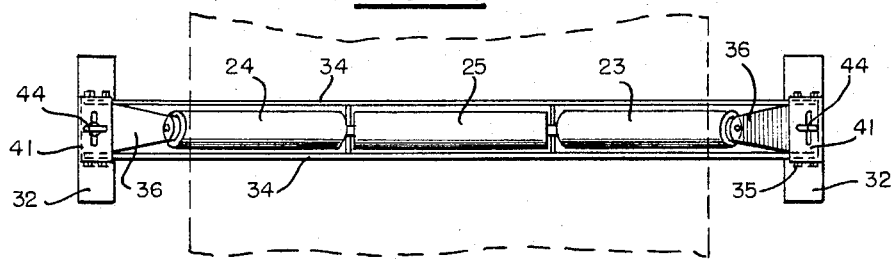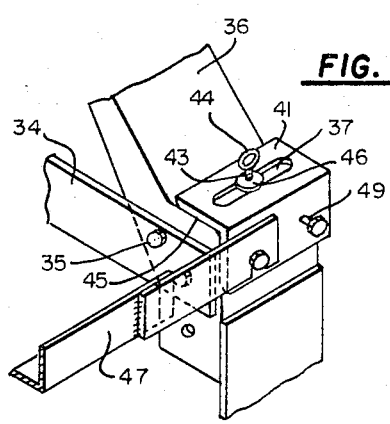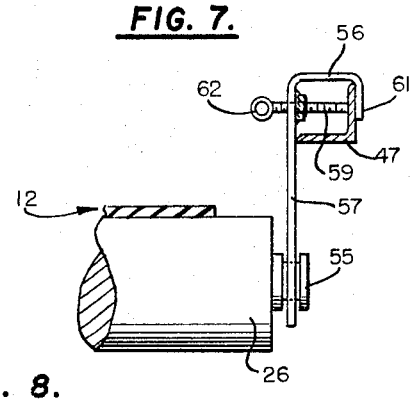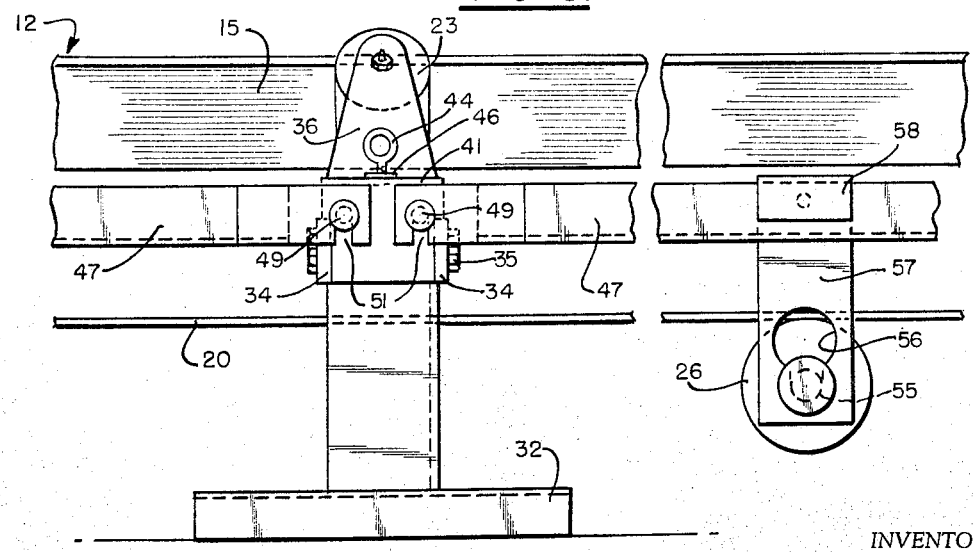

United States Patent Office 3,272,315
Patented Sept. 13, 1966

3,272,315
EXTENSIBLE BELT CONVEYOR
Robert M. Promin, Clifton, and William F. Bankauf, East Paterson, N.J., assignors to Litton Industries, Inc., a corporation of Delaware
Filed Dec. 20, 1963, Ser. No. 332,033
4 Claims. (Cl. 198—204)

The present invention pertains to an endless extensible belt type conveyor and a head section and an intermediate section through which the belt is supported between the head and a tail section which is movable from the head to increase the effective or operative length of the conveyor belt. The invention more specifically relates to structure supporting the troughing roller assemblies and return idler rollers of the intermediate section.

An extensible type of belt conveyor mechanism is known and provides useful equipment for moving granular material from a mine in a mining operation. The tail section of such equipment is adaptable to be moved away from the head section as the mining operation progresses. Existing conveyor equipment includes an intermediate section which comprises idler troughing roller assemblies and return idler rollers which support the belt between the tail and head sections. As the space between the tail and head section is increased the intermediate section must be equipped with additional rollers to properly support the belt.

It is an object of the present invention to provide improvements in the structure supporting the idler rollers of the intermediate section of an endless extensible belt conveyor mechanism and providing means for altering the angle of the idler rollers with respect to the run of the conveyor belt and to thereby impart the proper tracking influence to the belt and avoid the tendency of the belt in its course of movement to overlie an end of the idler rollers.

Another object of the invention is to provide improvements in the structure supporting the idler rollers whereby additional lengths of the side rails forming a part of the intermediate section may be readily erected and additional roller assemblies secured thereto without the need of skilled labor whereby the intermediate section of a conveyor mechanism may be readily lengthened or shortened.

A further object of the invention is to provide means in the intermediate section of an extensible belt conveyor to properly support both runs of the conveyor belt regardless of the irregularities of the mine floor or supporting surface.

A more specific object of the invention pertains to the bracket structure which is arranged at the ends of the idler rollers and which supports side rails of the intermediate section of the conveyor mechanism in such a manner that the ends of the rollers may be moved relative to the length of the side rails to properly train the belt in its movement over the supporting rollers.

Other objects and features of the invention will be appreciated and become apparent to those skilled in the art as the present disclosure proceeds and upon consideration of the annexed drawings and the following detailed description wherein an exemplary embodiment of the invention is disclosed.

In the drawings:
FIG. 1 is a diagrammatic view illustrating an extensible belt conveyor mechanism in which the invention is incorporated.
FIG. 2 is a fragmentary side elevation of a portion of the intermediate section of the conveyor.
FIG. 3 is a transverse sectional view through the intermediate section and taken on the line 3—3 of FIG. 2.

FIG. 4 is a similar view taken on the line 4—4 of FIG. 2.
FIG. 5 is a plan view of one of the troughing roller assemblies taken on the line 5—5 of FIG. 3.
FIG. 6 is a perspective view showing a portion of the connection of a troughing roller assembly with a portion of the associated side rail.
FIG. 7 is an elevational view of one end of a return idler roller and its attachment to an associated side rail.
FIG. 8 is a side elevational view on a larger scale showing side rail sections in relation to the idler roller assemblies.

The invention pertains to structural features supporting the top run of a conveyor belt and the return run of the belt throughout an intermediate section of an endless extensible conveyor mechanism. The head section of such equipment is illustrated at 10 in FIG. 1 and the tail section is shown at 11. An endless conveyor belt 12 extends around an idler roller 14 forming a part of the tail section 11 and the forward portion of the upper run of the belt is arranged to receive material to be moved such as that delivered by mechanical mining apparatus (not shown). The upper and active run of the conveyor belt 12 extends from the tail section 11 to the head section 10 and is guided and supported throughout the intermediate section 16 by idler rollers which support the top run 15 of the belt and the return run 20. The top run 15 of the belt is adapted to discharge the material such as coal or the like from the head section 10 onto a suitable conveyor such as indicated at 17. The head section 10 is equipped with means for storing and paying out varying portions of the continuous belt 12. The tail section 11 carrying the idler roller 14 is equipped with suitable means such as endless tracks 18 so that it may be moved away from he head section 10 to increase the effective length of the conveyor mechanism such as is required as a mining operation proceeds. The head section 10 accommodates an automatic take-up and belt storing assembly which while ordinarily remaining stationary is equipped with suitable means such as endless tracks 19 for moving the head section and adjusting the position thereof in relation to a receiving equipment such as the conveyor 17. The belt storage assembly and the automatic take-up mechanism maintains substantially constant tension on the belt 12 as its effective length is changed or altered.

The invention pertains to the intermediate section 16 of such a conveyor mechanism and the support of the conveyor belt 12 in the zone between the tail section 11 and the head section 10. The top run 15 and the belt throughout the intermediate section 16 is supported by roller assemblies 21 which are arranged to provide troughing of the upper run 15 of the belt. The troughing roller assemblies 21 each include wing rollers 23 and 24 and a central roller 25 as shown in FIG. 3. The rollers 23 and 24 have their axes disposed at angles to the axis of the roller 25 so as to cause the upper run 15 of the belt to trough in a well known manner. The lower return run 20 of the belt is supported by idler rollers 26 which support the belt in a single plane.

A feature of the invention pertains to the supports of the roller assemblies 21 and the rollers 26 which form parts of the intermediate section. An upright standard 31 is provided at each side of the belt. A foot structure 32 is carried by the lower end of each standard 31 which are adapted to engage the floor of the mine or the like. Two transverse tie members 34 extend between the upper end portions of a pair of standards 31 and the tie members 34 may take the form of bars as shown. The ends of the tie members 34 may be attached to the upright standards in any suitable manner such as by cap screws 35. An angularly disposed arm 36 is carried by the upper end of each upright standard 31 and these arms for each roller assembly are inclined inwardly in proceeding upwardly as best shown in FIG. 3 to provide support for the outer ends of the rollers 23 and 24. Any suitable bearing assembly may be provided between the arms 36 and the outer ends of the wing rollers and bearing assemblies 39 are provided between the ends of the roller 25 and the inner ends of the wing rollers.

An L-shaped bracket 41 is provided at the upper end of the upright standard 31 and is adapted to be secured to the arm 36 so as to permit adjustment of the bracket 41 in directions lengthwise of the conveyor assembly or transversely of the associated idler assembly. It is for this purpose that the bracket 41 is provided with an elongated slot 37 as best shown in FIG. 6. A shoulder 45 is provided on each arm 36 for accommodating one leg of the bracket 41. A threaded screw 43 extends through the slot 37 into the arm 36. The screw 43 is provided with an eyelet 44 to facilitate turning by a simple tool and an annular shoulder 46 on the screw serves to clamp the bracket 41 in its adjusted positions on the associated arm 36.

Side rails in the form of sections 47 are provided along the sides of the intermediate section. The end portion of each side rail section is equipped with a slot 51 (FIG. 8) which are adapted to fit over a stud 49 carried by the bracket 41. Each stud 49 has an enlarged head which is of greater area than the transverse dimensions of the slot 51 to maintain the side rail sections 47 in operative relation with the bracket 41 and the associated troughing roller assembly.

When the tail section 11 is moved to the right in FIG. 1 as a mining operation proceeds and while the head section 10 remains in a fixed position the active length of the conveyor belt 12 is increased between the head and tail sections. Additional idler rollers for supporting both the top run 15 and the return run 20 of the belt must be added to the intermediate section 16. A pair of side rail sections 47 are added to the intermediate section by attaching the ends of the side rail sections 47 to the respective studs 49 of the last pair of standards 31. Another roller assembly 21 is arranged on the inclined arm 36 of another pair of standards 31 added to the intermediate section for increasing its length and the other ends of the side rail sections are then applied over the studs 49. This structural arrangement facilitates the erection of troughing roller assemblies and facilitates their removal when there is a retreating of the mining apparatus. The side rail sections 47 and their connections with the idler roller facilitates removal of the entire conveyor belt mechanism and facilitates installation in another mining operation.

Another feature of the invention pertains to the idler rollers 26 which support the return run 20 of the conveyor belt. The rollers 26 may be designed to support the conveyor belt in a single plane as best shown in FIG. 4 and desirably extend throughout the width of the conveyor belt 12. Suitable bearings are provided for journalling each roller 26 for rotation about its axis. The bearing assembly 55 at one end of the roller 26 is adapted to be introduced through a relatively large opening 56 (FIG. 8) formed in a hanger bracket 57 which is provided at each end of the roller 26. The bearing assembly 55 enters a narrow slot below the opening 56 so that the bearing 55 is maintained in a non-rotatable position by the bracket 57. The upper end of the hanger bracket 57 is hook shaped as indicated at 58 in FIG. 8 and extends over one of the side rail sections in a manner illustrated in FIG. 7. A threaded screw 59 extends through the hanger bracket and is adapted to clamp the end portion 61 of the hanger bracket in firm engagement with the side rail section. An eyelet 62 carried by the threaded screw 59 facilitates the tightening and loosening of the screw by a simple tool.

The side rail structure and the supporting members for the idler rollers 26 permits adjustment of the position of the rollers relative to the travel of the belt 12. However, the conveyor belt also often tends to run off the ends of the troughing idler roller assemblies 21. Under such circumstances a tool may be inserted in the eyelet 44 whereby the screw 43 which clamps the bracket 41 to an arm 36 may be loosened. The associated end of the roller assembly 21 may then be moved lengthwise of the side rail structure to alter the angular relationship of the roller assembly 21 relative to the course of movement of the upper run 15 of the belt 12 by moving the standard 31 supporting the roller assembly in question. Opposite ends of the roller assemblies 21 may be so moved to further facilitate adjustment of the angular relation of the roller assembly relative to the length of the belt 12. The hanger brackets 57 which support the idler rollers 26 may be adjusted along the length of the side rail sections 47 by loosening the screws 59 which clamp the hanger brackets to the side rail sections whereby the axis of each idler roller 26 may be adjusted in relation to the return run of the belt.

While the invention has been described with reference to one type of conveyor it will be appreciated that the structure for supporting the idler roller assembly may be adapted to other types of conveyor mechanisms. Changes may be made in the structural elements together with modifications in the overall organization. Such modifications and others may be made without departing from the spirit and scope of the invention as set forth in the appended claims.

What we claim and desire to secure by Letters Patent is:

1. A conveyor belt mechanism, comprising upright standards, a belt, an idler roller troughing assembly extending transversely under one run of said belt, arm means carried by the upright standards supporting the roller assembly, brackets, means for connecting each of said brackets to one of said standards for movement relative thereto in directions lengthwise of the belt, means for releasably securing the brackets to the respective upright standards against movement, side rail sections, means for detachably connecting said side rail sections and said brackets, a return idler roller extending transversely under another run of said belt, hanger brackets carried by said side rail sections supporting said return idler roller, said hanger brackets being movable along the respective side rail sections, and means maintaining the hanger brackets in fixed positions relative to said side rail sections.

2. In a conveyor belt mechanism according to claim 1 wherein said means for detachably connecting said brackets and side rail sections comprises studs carried by the brackets and slots in the side rail sections for receiving said studs.

3. In a conveyor, spaced opposed side rails formed of sections extending along opposite sides of a length of said conveyor, bracket members pivotally interconnecting the rail sections on horizontal axes along each side of said conveyor for pivotal movement relative to each other about horizontal axes extending transverse their length, upright standards in spaced opposed pairs positioned along said rail sections with one of each of said pairs of standards being positioned at opposite sides of said conveyor, idlers each supported by a pair of said opposed standards, each of said bracket members being vertically supported by one of said standards, said rail sections being in turn vertically supported by said bracket members, means for movably securing each of said bracket members to an associated standard whereby the latter standard may be moved lengthwise of said rail sections adjacent the latter standard while the latter said sections remain relatively longitudinally stationary and remain in vertically supported association with said bracket members and said standards, comprising means forming a slot extending lengthwise of said conveyor, said slot being formed in one member of the combination formed by said each of said bracket members and a said associated standard, and a screw member affixed to the other member of said combination, said screw member being alternately operable to secure said members of said combination in fixed relationship longitudinally with respect to said sections and to release the members of said combination sufficiently for movement of the standard thereof relative the bracket member and the rail sections connected to the latter.

4. A conveyor as set forth in claim 3 wherein each bracket member of said combination is L-shaped and one leg thereof rests in vertically supported relationship on a shoulder of the standard of said combination and the rail sections connected to the latter bracket member are connected to one leg thereof.

References Cited by the Examiner

UNITED STATES PATENTS

| 2,592,831 | 4/1952 | Spurgeon | 198—192 |
| 2,605,887 | 8/1952 | Duncan | 198—192 |

FOREIGN PATENTS

| 205,593 | 5/1955 | Australia. |
| 364,294 | 1/1932 | Great Britain. |
| 838,212 | 5/1960 | Great Britain. |

EVON C. BLUNK, *Primary Examiner.*

EDWARD A. SROKA, SAMUEL F. COLEMAN,
           *Examiners.*

UNITED STATES PATENT OFFICE
CERTIFICATE OF CORRECTION

Patent No. 3,272,315  September 13, 1966

Robert M. Promin et al.

It is hereby certified that error appears in the above numbered patent requiring correction and that the said Letters Patent should read as corrected below.

In the heading to the printed specification, lines 4 and 5, for "assignors to Litton Industries, Inc., a corporation of Delaware" read -- assignors, by mesne assignments, to Hewitt-Robins, Stamford, Conn., a corporation of Delaware --.

Signed and sealed this 29th day of August 1967.

(SEAL)
Attest:

ERNEST W. SWIDER  
Attesting Officer

EDWARD J. BRENNER  
Commissioner of Patents